United States Patent [19]

McIntosh

[11] 3,830,979

[45] Aug. 20, 1974

[54] TELEPHONE HANDSET AMPLIFIER

[75] Inventor: Alex McIntosh, Oak Harbor, Wash.

[73] Assignee: Tone Commander Systems, Inc., Redmond, Wash.

[22] Filed: May 2, 1973

[21] Appl. No.: 356,334

[52] U.S. Cl. ................. 179/1 A, 179/81 B, 330/13, 317/101 F

[51] Int. Cl. ............................................ H04m 1/60

[58] Field of Search ...... 179/1 A, 81 B, 103, 182 A; 325/355; 330/13; 317/101 F

[56] References Cited

UNITED STATES PATENTS

| | | | |
|---|---|---|---|
| 2,892,131 | 6/1959 | MacDonnell | 317/101 F |
| 3,077,545 | 2/1963 | Rywak | 330/13 |
| 3,254,160 | 5/1966 | Day et al. | 179/81 B |
| 3,277,243 | 10/1966 | Fairbairn | 179/81 B |
| 3,632,878 | 1/1972 | Stratman | 179/81 B |
| 3,733,441 | 5/1973 | McCorkie et al. | 179/81 B |

FOREIGN PATENTS OR APPLICATIONS

| | | | |
|---|---|---|---|
| 1,515,504 | 7/1969 | Germany | 317/101 F |
| 1,908,445 | 11/1969 | Germany | 317/101 F |

*Primary Examiner*—Kathleen H. Claffy
*Assistant Examiner*—Douglas W. Olms
*Attorney, Agent, or Firm*—Sherman Levy

[57] ABSTRACT

A receiver amplifier attachment for a Trimline telephone handset which is installed without modification of the handset. The amplifier attachment consists of a transistorized amplifier circuit mounted on a flexible strip and employing printed circuitry. The strip is slit longitudinally at one end portion and the two segments thus defined have respective printed and terminals with printed connections to the input and output of the amplifier circuit. With the back cover of the handset removed, these are clamped on opposite sides of the normal receiver board terminals of the handset by a Nylon screw which is substitured for the normal metal connection screw, whereby the amplifier is connected into the handset receiver circuit. The strip has a large aperture at its opposite end portion to define a loop which is engaged over and interlocks with the peripheral shoulder of the handset connection plug receptacle so that the strip is stretched over the handset. Respective flexible terminal wires are provided on the strip to connect the amplifier to the transmitter supply voltage and common terminals of the handset. A volume control potentiometer is mounted on the outer margin of the apertured end portion of the strip. The attachment is thus substantially fully housed beneath the back cover of the handset when the cover is replaced.

12 Claims, 6 Drawing Figures

PATENTED AUG 20 1974

3,830,979

TELEPHONE HANDSET AMPLIFIER

This invention relates to telephone handset amplifier attachments, and more particularly to a receiver amplifier attachment for use with a telephone handset of the Trimline type.

A main object of the invention is to provide a novel and improved receiver amplifier which can be installed in a telephone handset without requiring modification of the handset and which can be installed quickly and easily in existing handsets by a telephone installer without the use of special equipment.

A further object of the invention is to provide an improved telephone handset receiver amplifier which is adapted to fit within a handset without requiring modification of the handset, which is inexpensive to manufacture, which is reliable in operation, and which will operate regardless of the polarity of the supply voltage available in the handset.

A still further object of the invention is to provide an improved telephone handset receiver amplifier which can be readily installed in a handset, which provides high receiver signal gain, which is relatively rugged in construction so that it can be readily removed and reinstalled as required, which can be employed equally well with handsets of the dial or touchtone type, which efficiently utilizes the available space in a handset, and which is arranged so that there is minimum possibility of incorrect installation.

A still further object of the invention is to provide an improved telephone handset receiver amplifier which can be installed in a handset and which is provided with a conveniently accessible but inconspicuous control means for adjusting the gain of the amplifier, and which does not interfere with the normal use of the handset.

Further objects and advantages of the invention will become apparent from the following description and claims, and from the accompanying drawings, wherein:

Figures 1, 2, 3, 4, 5, 6:
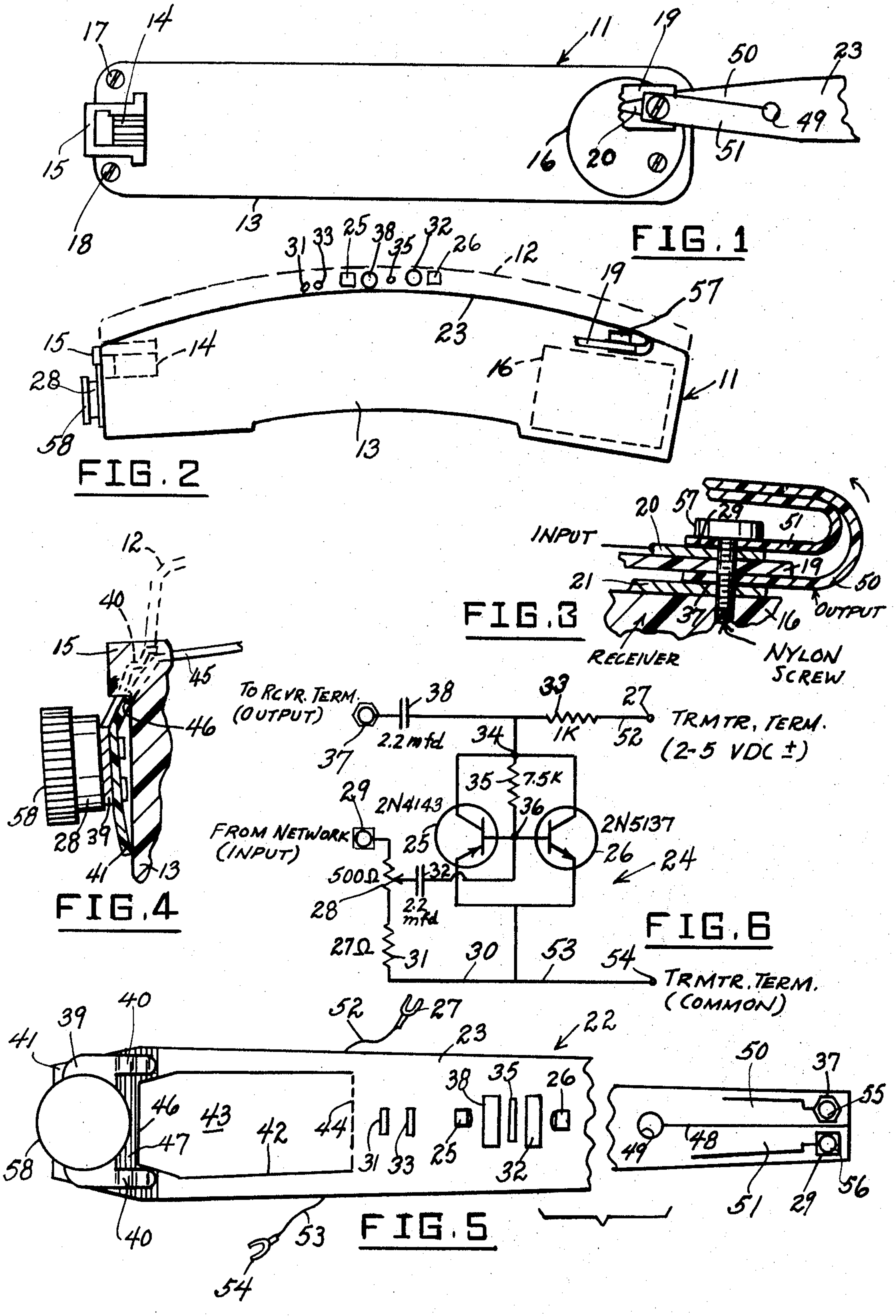
FIG. 1 is a diagrammatic top plan view of a typical telephone handset with its back cover removed and showing the initial stage of installation of an improved receiver amplifier attachment according to the present invention.
FIG. 2 is a diagrammatic elevational view of the handset of FIG. 1 with the receiver amplifier attachment of the present invention operatively mounted thereon.
FIG. 3 is an enlarged fragmentary longitudinal vertical cross-sectional view taken through the amplifier input and output connection legs in the configuration of FIG. 2.
FIG. 4 is an enlarged fragmentary longitudinal vertical cross-sectional view taken through the end portion of the attachment carrying the volume control potentiometer, in the configuration of FIG. 2.
FIG. 5 is a fragmentary diagrammatic plan view of the amplifier attachment employed in FIGS. 1 to 4, shown in a substantially flat state prior to installation, but not showing its printed circuitry.
FIG. 6 is a wiring diagram of the printed circuitry of the amplifier attachment of FIG. 5.

Referring to the drawings, 11 generally designates a conventional telephone handset of the Trimline type manufactured by Western Electric Co., Inc., Hawthorne, N.J. A typical handset of this type has a removable back cover, shown in dotted view at 12, which interlocks with the main housing 13 of the handset with a snap fit. The handset is operatively connected to the telephone lines by a connection plug, not shown, which is received in a plug receptacle 14 forming part of the handset assembly, said receptacle having a peripheral rib or shoulder 15 which projects from the left end of main housing 13, as viewed in FIGS. 1 and 2. The back cover 12 may be easily detached from the main housing 13 by means of a simple prying tool, such as a screw driver or the like.

The handset 11 is provided with conventional circuitry and components including a transmitter microphone located in the left end portion of main housing 13 and a sound reproducing receiver 16 mounted in the right end portion of the main housing, as viewed in FIGS. 1 and 2. In a typical design of the Trimline handset, the unit has a transmitter power terminal screw 17 and a "common" terminal screw 18 located in the left hand portion of the unit. The typical conventional handset assembly also includes a circuit board having a lug element 19 carrying an output terminal lug 20 which is normally conductively connected to an input terminal lug 21 of the receiver 16 by a metal connection screw.

As will be presently described, the receiver amplifier attachment of the present invention is electrically connected between the normal output terminal lug 20 and the receiver input terminal lug 21.

The receiver amplifier attachment is designated generally at 22 and comprises an elongated strip 23 of thin flexible plastic material on which is mounted a transistorized amplifier 24. The amplifier 24 is generally conventional except that it employs a PNP transistor 25 and an NPN transistor 26 with their collector-emitter circuits connected in parallel and their base electrodes connected together, so that the amplifier will operate regardless of the polarity of the supply voltage provided at its power supply terminal 27. As shown in FIG. 6, the amplifier is provided with a volume control potentiometer 28 whose element is connected between an input terminal 29 and the common terminal wire 30 through a resistor 31. The sliding tap of the potentiometer is connected through a capacitor 32 to the common junction 36 of the base electrodes of the transistors 25 and 26. The power input terminal 27 is connected through a resistor 33 to the common junction 34 of the collectors of said transistors, and a load resistor 35 is connected between the collector junction 34 and the base junction 36. The amplifier output terminal 37 is connected to the collector junction 34 through an output capacitor 38.

The various components of the amplifier except for the potentiometer 28 are mounted on the intermediate portion of the thin flexible strip 23 and are interconnected in the manner shown in FIG. 6 by conventional printed conductors. The potentiometer 28 is mounted on a U-shaped thin spring metal supporting bracket 39 having sinusoidally bent resilient legs 40,40, and the potentiometer and bracket are secured on the generally tapered left end portion 41 of strip 23, as viewed in FIG. 5.

The strip 23 is formed with a large U-shaped slit 42 defining a leftwardly directed tongue 43 which is detachable at a scored transverse line 44 located adjacent the intermediate portion of the strip 23, thereby defining an aperture 45 whose left end transverse edge 46 is located rightwardly adjacent the spring bracket 39. The top surface of strip 23 is transversely grooved or corrugated adjacent the left end portion of aperture 45, as shown at 47, to define a gripping anti-friction surface cooperative with the corrugated spring fingers 40 to hold the bracket 39 and potentiometer 28 substantially rigidly in position when the back cover 12 is replaced, as will be presently described.

The right end portion of strip 23, as viewed in FIG. 5, tapers gradually in width and is formed with a median longitudinal slit 48 leading from a circular aperture 49 to the right end of the strip, thus defining a pair of side-by-side relatively long flexible legs 50 and 51. The printed circuit amplifier output terminal 37 is located at the end of leg 50 and the printed circuit amplifier input terminal 29 is located at the end of leg 51, said terminals 37 and 29 being apertured, as shown at 55 and 56.

A first insulated flexible terminal lead wire 52 is provided between resistor 33 and the power input terminal lug 27, and a second insulated flexible lead wire 53 is connected to the amplifier common conductor 30 and has a connection lug 54.

In installing the amplifier attachment 22, the line connection plug is disengaged from the receptacle 14 and the back cover 12 is removed. The metal connection screw normally connecting board terminal 20 to receiver input terminal 21 is unscrewed and is discarded. The tongue 43 is removed from the strip at the tear line 44. The strip is turned over so that the amplifier 24 faces downwardly and the strip is arranged substantially lengthwise rightwardly of the handset, as shown in FIG. 1. The legs 51 and 50 are then flexed laterally toward each other and are placed respectively above and below the circuit board lug 19 so that the apertures 55 and 56 are brought substantially into alignment with the connection apertures of terminals 20 and 21, and a Nylon screw 57 is inserted through the aligned apertures and screwed into place in substitution for the original metal screw. In this configuration the amplifier input terminal 29 is clamped in contact with the circuit board terminal 20 (the original input source for the telephone receiver 16) and the amplifier output terminal 37 is clamped in contact with the telephone receiver input terminal 21. This effectively connects the amplifier 24 between terminals 20 and 21.

The strip 23 is then flexed upwardly and leftwardly over the handset and the free end of the strip is pulled leftwardly until the aperture 45 can be engaged over the peripheral shoulder rib 15 of the receptacle 14 and the edge 46 of the aperture can be slipped over the shoulder 15 and be lockingly engaged therebeneath in the manner shown in FIG. 4. In this position the spring fingers 40,40 are located on opposite sides of receptacle 14 and are in positions to be clampingly engaged by the bottom edge of back cover 12 when it is replaced on the main housing 13.

The flexible conductors 52 and 53 are then respectively connected to the handset power and common terminal screws 17 and 18 by means of their terminal lugs 27 and 54. The back cover 12 is snapped back into its original covering position on the main housing 13 and the line connection plug is reinserted in the receptacle 14, thereby completing the installation.

The volume control potentiometer 28 is provided with a control knob 58 which is readily accessible at the transmitter end of the handset, being located immediately beneath the cord connection plug of the handset, so that it can be conveniently employed for adjusting the receiver gain to a desired level.

While a specific embodiment of an improved receiver amplifier attachment for a telephone handset has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a telephone handset assembly having a receiver provided with an input terminal and a circuit board element carrying an output terminal located over and in registry with said receiver input terminal, an amplifier receivable in the handset assembly and having an input terminal leg engageable on said output terminal overlying said circuit board element and an output terminal leg engageable on said receiver input terminal underlying said circuit board element, insulating fastening means extending through said input terminal leg, said circuit board element and said output terminal leg and clamping said amplifier input terminal leg to said output terminal and said amplifier output leg to said receiver input terminal, whereby to connect said amplifier between said circuit board output terminal and said receiver input terminal, voltage supply means in the handset, and circuit means operatively connecting said amplifier to said voltage supply means.

2. The telephone handset assembly of claim 1, and wherein said assembly includes an elongated main housing in one end of which the receiver is contained and having a projection at its other end, said amplifier being provided with and being mounted on a support in the form of an elongated flexible strip, said input and output terminal legs comprising side-by-side relatively flexible end portions of said strip, and means on the strip lockingly engageable with the projection when the strip is reversely bent over the housing, whereby the strip can be secured in overlying relation to the housing.

3. The telephone handset assembly of claim 2, and wherein said strip is formed with an aperture at its end portion opposite said terminal legs, said locking means comprising an edge portion of said aperture.

4. The telephone handset assembly of claim 3, and wherein said amplifier is provided with a volume control member mounted on the end portion of said strip outwardly adjacent said aperture.

5. The telephone handset assembly of claim 4, and wherein said insulating fastening means comprises a screw of insulating material engaged through said circuit board element and through said amplifier input terminal leg, said circuit board output terminal, said amplifier output terminal leg and said receiver input terminal.

6. The telephone handset assembly of claim 5, and a bracket member secured between said volume control member and said strip, said bracket member having finger portions extending on opposite sides of said projection when said aperture edge portion is lockingly engaged with said projection.

7. The telephone handset assembly of claim 6, and wherein said housing is provided with a removable back cover having a bottom edge portion clampingly engageable with said finger portions when the cover is mounted on the housing.

8. A telephone handset amplifier attachment comprising an elongated strip of flexible insulating material shaped to be received in a handset, an amplifier mounted on the intermediate portion of said strip, said strip being formed at one end with relatively flexible normally coplanar side-by-side elongated leg portions, respective apertured terminals on the ends of said leg portions, said leg portions being sufficiently flexible so that they may be at times superimposed to bring the apertured terminals into registry, and circuit means respectively connecting said terminals to the input and output of the amplifier.

9. The telephone handset amplifier attachment of claim 8, and wherein said strip is formed adjacent its opposite end with an aperture defining a locking edge at said opposite end.

10. The telephone handset amplifier attachment of claim 8, and wherein said amplifier comprises a PNP transistor and an NPN transistor with their collector-emitter circuits connected in parallel to render the amplifier insensitive to supply voltage polarity.

11. The telephone handset amplifier attachment of claim 9, and wherein the amplifier is provided with a volume control member mounted on said opposite end of the strip outwardly adjacent said aperture.

12. The telephone handset amplifier attachment of claim 11, and a bracket member secured between said volume control member and said opposite end of the strip, said bracket member having a pair of spaced inwardly extending finger elements.

* * * * *